Aug. 4, 1953     H. W. ENSIGN     2,647,345
FLUID PRESSURE REGULATOR WITH TIGHT SHUTOFF ACTION
Filed June 25, 1951
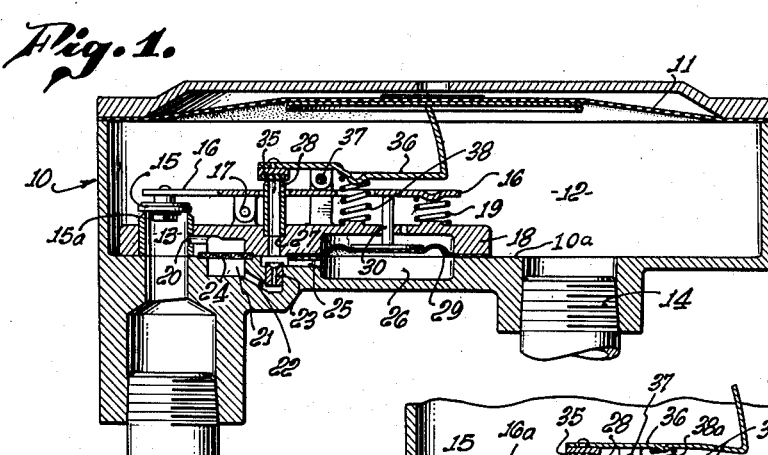
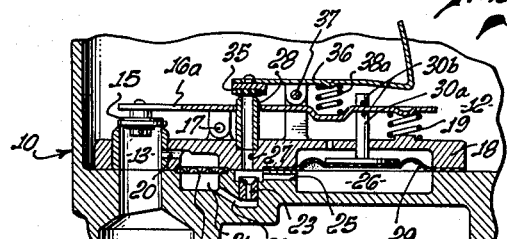
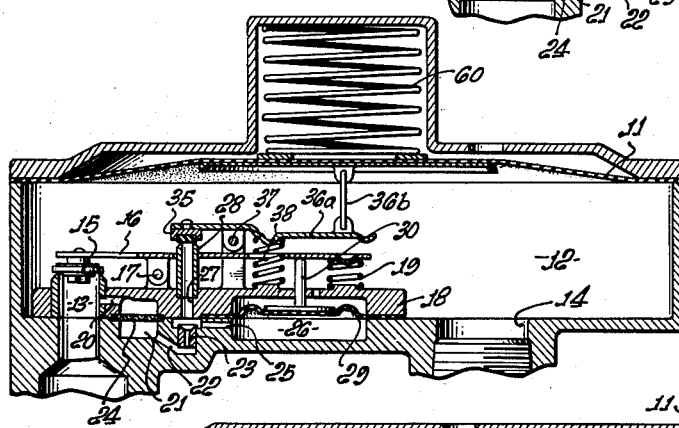
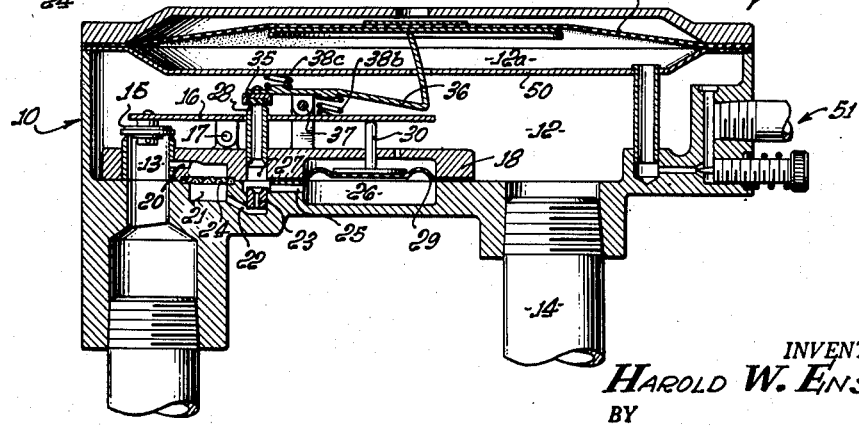
INVENTOR.
HAROLD W. ENSIGN,
BY
Barbados & Scantlebury
ATTORNEYS.

UNITED STATES PATENT OFFICE 2,647,345

FLUID PRESSURE REGULATOR WITH TIGHT SHUTOFF ACTION

Harold W. Ensign, Fullerton, Calif., assignor to Ensign Carburetor Company, Huntington Park, Calif., a corporation of California Application June 25, 1951, Serial No. 233,383

10 Claims. (Cl. 50—10)

This invention has to do with fluid pressure regulators, its purpose being, among other things, to provide a regulator with means for causing tight closure of the regulator valve when there is no draft on the outlet.

The invention is generally applicable to regulators of the type employing a diaphragm or equivalent element exposed to and actuated by the regulated pressure to operate the inlet controlling valve. Where a regulator delivers into a closed system, by causing the valve to close tightly the invention obviates any build-up of delivery pressure which may otherwise be necessary to force the valve closed tightly enough to shut off the leakage that builds up the pressure. The present primary utility of the invention is, however, in regulators which are set to deliver into an open system (such as an engine carbureter) at a slightly sub-atmospheric pressure. In such regulators the valve closing force, without the addition of some type of special closing means, is determined by the size of the actuating diaphragm and the pressure differential; and it is desirable to keep both of those quantities small. The present invention provides a simple and reliable means of closing a regulator valve considerably tighter than it would be closed by the pressure differential acting on the diaphragm; and consequently makes it feasible to operate the regulator on a smaller pressure differential, and/or with a smaller diaphragm, and/or to close its valve more tightly.

The invention will be explained primarily in its application to a regulator mechanism of single stage type delivering at sub-atmospheric pressure, but is not intended to be thereby limited in any of those regards. With that understanding the invention will be understood from the following description of the preferred and illustrative embodiments which are shown in the accompanying drawings, in which:

Fig. 1 is a somewhat schematic sectional view showing one embodiment; and

Figs. 2, 3 and 4 are similar views showing modifications, Fig. 2 being fragmentary.

Referring first to Fig. 1, a body 10 and a diaphragm 11 enclose a diaphragm chamber 12 which has an inlet at 13 for the initial relatively high pressure and an outlet at 14 for the fluid at the lower regulated pressure. An inlet valve 15 controls the inlet and is here illustrated as closing against the initial pressure. Valve 15 is commonly and is here shown mounted on one end of a valve lever 16 pivoted medially at 17. Pivot 17 is conveniently carried on a part 18 which, although functionally a part of the body, is conveniently a separate piece for accommodation of other parts and for ease of assembly. Lever 16 extends beyond the other side of its pivot and a spring 19 is shown as acting on the lever in a direction to move the valve closed. If it is assumed that the initial pressure at 13 is constant or fairly so (for instance, that there is primary pressure regulation of that pressure by, for example, the regulator here shown being the second stage of a two-stage regulator) and if spring 19 is chosen or set to overcome the opening pressure on the valve by a given force; then that excess closing pressure is the measure of the force which diaphragm 11 must exert to open the valve. In regulators delivering at sub-atmospheric pressure diaphragm 11 is ordinarily exposed on its outer face to atmosphere, and is so shown here. The force which the diaphragm, of any given size, can exert is consequently fixed by the measure of the sub-atmospheric pressure in its delivery chamber 12. Consequently, if diaphragm 11 of given size merely operated valve lever 16 as it does in a standard regulator, the closing force on valve 15 when there is no draft on the regulator outlet would be measured by the depression below atmosphere at which the regulator delivers. To make that delivery depression small the diaphragm can of course be increased in size, or the leverage ratio of the valve lever can be increased with attendant increase in diaphragm travel. But both those expedients are objectionable. Instead, the invention provides, in illustrative form the following.

A passage 20, 21, 22, formed in body piece 18 and body wall 10a, leads from the initial inlet 13 to a restricted orifice 23; a screen 24 in 21 protecting the small orifice from becoming clogged. The orifice feeds the initial pressure through a passage 25 to an auxiliary diaphragm chamber 26, and through a passage 27 to an auxiliary valve seat 28. Auxiliary diaphragm 29 is conveniently edge-clamped between wall 10a and piece 18 and has a stem 30 projecting up under lever 16. Diaphragm chamber 26 is below the diaphragm so that pressure in the chamber will press stem 30 up under lever 16 to move that end of the lever up and move and hold valve 15 closed.

Valve seat 28 is formed on the upper end of a tube that forms a part of passage 27. For convenience of illustrating the whole mechanism in one plane, the tube is shown as extending freely through a hole in lever 16. An auxiliary valve 35 seats on valve seat 28 and controls the relief of fluid from passage 27. Valve 35 is carried on one end of a valve lever 36 pivoted medially at 37 and having its other end in contact with diaphragm 11. A spring 38 acts on lever 36 to close valve 35. Lever 36 is so formed and so located with reference to lever 16 that initial depression of the right hand end of 36 will first raise valve 35 off its seat, and then further depression of that end of 36 will contact the right hand end of valve lever 16 and depress it to raise main valve 15 off its seat. That arrangement of the two valve levers constitutes in simple form an interconnective means between them involving lost motion for operation of lever 16 after initial operation of lever 36.

The action of the arrangement of Fig. 1 is as follows. With no draft on outlet 14 and atmospheric pressure in outlet chamber 12, the parts stand in the position shown. The initial pressure at inlet 13 tends to lift valve 15 off its seat 15a. That same pressure stands in diaphragm chamber 26 and, through stem 30 and lever 16, exerts a closing force on the valve. Assuming first that spring 19 exerts a force which is small or negligible in comparison to the opening force on the valve, or that spring 19 is absent (see Fig. 3), then diaphragm 29 is made of such size that, considering the leverage ratio of lever 16, the diaphragm will exert a valve closing force enough greater than the valve opening force to hold the valve tightly closed. Thus, for example, the closing force exerted by the diaphragm may be, say, twice the opening force. With spring 19 negligible, all, or substantially all of the force tending to hold the valve closed is exerted by the diaphragm.

Spring 38 is preferably just strong enough to hold auxiliary valve 35 closed tightly. As the effective pressure area of valve 35 is quite small (much smaller than that of valve 15) spring 38 can close valve 35 very tightly and still exert a very much smaller force than is necessary to keep the main valve 15 closed equally tightly.

On a slight lowering of pressure in diaphragm chamber 12 diaphragm 11 moves inwardly, overcoming the slight pressure of spring 38, and opening valve 35. With lever 36 moved into contact with lever 16, valve 35 is open by a definite and predetermined amount. For purposes of simplifying the description here it may be assumed that valve 35 then stands substantially wide open. Assuming also that passages 20, 21, 22, 25 and 27 are large relative to restriction 23, which they preferably are, then the drop in pressure in diaphragm chamber 26 with valve 35 open is controlled by the size of orifice 23. The pressure drop in chamber 26 may be, and preferably is, made to be greater than that due solely to the pressure drop through orifice 23, by arranging passage 25 and orifice 23 in such relation, as shown, that the jet from the orifice has an ejector action on passage 25. With that additional action orifice 23 does not have to be quite as small as it would otherwise; but in any case, given any certain initial pressure, the pressure drop in 26 depends on the selected size of orifice 23.

That orifice size is selected to drop the pressure in 26 to the point where the force of diaphragm 29 will be just sufficient to hold main valve 15 closed against the opening pressure on it or, if spring 19 is used, to the point where the sum of the diaphragm and spring forces will be just sufficient to keep valve 15 from being opened by the opening pressure on it. If the initial pressure at inlet 13 is a well regulated one, orifice 23 can be accurately sized to bring the system to a condition where the excess of the force or forces holding valve 15 closed is very small.

A further very slight drop in pressure in chamber 12 will then cause further inward movement of diaphragm 11. With lever 36 in contact with valve lever 16, the diaphragm then operates lever 16 just as if it were directly connected with that lever, operating main valve 15 in the usual manner to maintain the pressure in chamber 12. Due to the fact that the excess force urging valve 15 closed is very small, the drop in pressure in 12 necessary to open the main valve initially, or to open it wider to keep up the regulated pressure, is likewise very small. Consequently, using a diaphragm of any given size with any given leverage ratio, the regulated pressure differential and pressure range necessary for operation is much smaller than in the standard type of regulator. Or, to obtain operation at the usual pressure differential and range, the diaphragm may be smaller, or the leverage ratio, and diaphragm travel, smaller than in standard regulators. And in either case the valve may be held much more tightly closed than usual.

Parenthetically, it may be noted that in a regulator where the valve actuating forces are quite small, the weights of the several moving parts, including particularly the main diaphragm, should be balanced. That can be done in any suitable manner; and is usually done by mounting the regulator in a position where the diaphragm and the pivots of the various levers are in substantially vertical planes. With such an understanding the description here ignores the weights of the various parts.

In the description of operation, so far, it has been assumed that spring 19 is absent or its force substantially negligible. We now assume that spring 19 is itself selected or adjusted to exert just sufficient force to hold valve 15 seated against the initial pressure on it. Then the effective size of diaphragm 29, to give the same total valve closing force as before, can be smaller. For instance to give a total valve closing force approximately twice the valve opening force, diaphragm 29 will be of a size, considering the ratio of lever 16, to exert a closing force about equal to the opening force. It may be smaller or larger than that, depending on how tightly it is desired to close the valve; but, with spring 19 exerting a closing force just slightly greater than the opening force on the valve, diaphragm 29 now exerts substantially only the excess closing force that closes the valve tightly. Then, in that arrangement, orifice 23 is chosen of a size that, on opening auxiliary valve 35, the pressure in chamber 26 will be dropped to zero (atmospheric) or substantially so. With the injector action before described it is possible to drop the pressure in 26 to zero or even below. With that pressure dropped to substantially zero, then main valve 15 is only held closed by the very small excess pressure of spring 19 after valve 35 has been opened. It may be here remarked that, as the pressure in chamber 26 can be dropped to something less than zero, spring 19 may be somewhat stronger than just above stated. Then, if pin 30 is attached to lever 16 (see e. g. pins 30b in Fig. 2) so that the diaphragm can pull lever 16 down, the total valve closing force, with valve 35 open, will then be only slightly greater than the valve opening force.

Between the two extremes, of spring 19 exerting no valve closing force and exerting a force substantially capable of holding the valve closed, the relation between the spring and diaphragm closing forces may be chosen as desired. For instance, spring 19 may be chosen to exert, say, a force equal to half of the opening force on the valve. Diaphragm 29 will then be sized to exert the other half of that force plus an excess depending on the excess valve closing force desired. If that excess force is to equal the valve opening force, then the diaphragm will exert a closing force equal to three halves of the opening force. And orifice 23 will then be chosen to drop the pressure in chamber 26 to the point where, with valve 35 open, the total spring and diaphragm closing forces will be just sufficient to hold valve 15 lightly closed.

In any of these cases the characteristic features of operation are the same as first described; the main valve is held tightly closed when the regulator is standing by forces which can be much larger than the forces required to operate the regulator valve; or, put the other way around, the differential forces required for regulative operation of the valve can be very small and the regulator still be closed tightly.

Fig. 2 illustrates a modification in which spring 38a (corresponding in function to spring 38 of Fig. 1) is seated on lever 16a. In that arrangement, when auxiliary valve lever 36 is moved to open valve 35 and to contact lever 16a, spring 38a is pressing on 16a against the force or forces which, with valve 35 open, are holding main valve 15 closed. So, in that particular arrangement, that closing force, whether of spring 19 or diaphragm 29 or both, will be made enough stronger to just hold valve 15 closed until lever 36 exerts pressure directly on 16a. Fig. 2 also shows diaphragm pin 30a connected to lever 16a by the pins 30b so that diaphragm 29 can pull down as well as press up on the lever.

Fig. 3 shows a modification in which spring 19 of Figs. 1 and 2 is omitted (as before mentioned). It also shows another alternative, or additional, position for spring 38. A spring 38b is shown in the same arrangement as 38a in Fig. 2. Another spring 38c is also shown pressing on valve lever 36 in a valve closing direction and based against a partition plate 50 which covers diaphragm 11 to form a subsidiary diaphragm chamber 12a restrictedly communicating with the outlet chamber 12. Functionally, spring 38c is the same as 38 of Fig. 1; and 30c may be used either alone or in conjunction with 38b. The function of partition plate 50, other than the subsidiary one of basing a spring like 38c, has nothing to do with the present invention. It forms a subsidiary chamber in which the pressure operating on diaphragm 11 may be modified from that in the main or outlet chamber 12, through the medium of such connections as shown generally at 51. See, for instance, such patents as 2,073,299 and 2,248,222.

It has been stated that the invention applies to regulators discharging at pressures above as well as below atmosphere. Fig. 4 illustrates application of the invention to a typical regulator stage, which may be either the single stage of a single stage regulator, or the first or second stage of a multiple stage regulator.

As there shown illustratively, most of the parts are the same as in Fig. 1 and are given the same numerals. The main diaphragm 11, however, has a reference pressure applied to it, here shown as the pressure of a spring 60 pressing inwardly on the diaphragm. And the diaphragm is illustratively shown as connected to the auxiliary valve lever by a connection 36b which can pull on the lever to force auxiliary valve 35 closed.

In an ordinary regulator, of the type here shown, set to discharge above atmospheric pressure, diaphragm 11 would be directly connected to the main valve lever 16 to pull on that lever to close main valve 15 as the diaphragm moves out against reference spring 60, with increasing pressure in chamber 12. The valve 15 then closes under an equilibrium of pressures: the initial pressure on the valve and the reference pressure of spring 60, both tending to open the valve, and the regulated fluid pressure on the inner face of the diaphragm tending to close the valve. For accurate pressure regulation, valve 15 should close tightly enough to prevent leakage when the pressure in 12 is only slightly above the desired regulated pressure; i. e. ideally the valve should close tightly under very little excess closing pressure. In practice, however, such valves must be closed under a considerable excess closing pressure, which pressure can only be generated by increase in pressure in 12 sufficient to close the valve tightly enough to stop leakage. That means that the range of the regulated pressure in 12 is relatively high, unless the valve actuating power is made large by using a large diaphragm 11, or a large leverage ratio with attendant large diaphragm travel. The invention overcomes that difficulty in this type of regulator in the same manner as for a sub-atmospheric regulator.

As in the forms previously described spring 19 and/or auxiliary diaphragm 29 may be designed to hold valve 15 tightly closed with any chosen excess closing pressure when auxiliary valve 35 is closed; and to hold valve 15 closed with a slight excess closing pressure when valve 35 is open. Spring 38, normally holding auxiliary valve 35 closed is not necessary in this form of regulator, as that valve can be closed by the connection 36b between lever 36a and diaphragm 11 being capable of pulling on lever 36b as well as pushing on it. On the other hand spring 38 can be used and the connection at 36b be a mere pushing connection, as it is in Fig. 1. In either case, the change in pressure in 12 to move valve 35 between its open and closed positions is very slight, due to the small size of valve 35. And with valve 35 open a slight drop in the pressure in 12 then causes opening of valve 15 in the same manner as before described.

An advantage inherent in my invention in its various forms is that the final regulated outlet pressure is affected relatively little by variations in the initial pressure. This is true in all the variations discussed, but particularly so where diaphragm 29 exerts most or all the closing pressure on main valve 15. The closing pressure exerted by that diaphragm follows the varying opening pressure closely; so that the pressure differential which has to be supplied by the regulated pressure on diaphragm 11 remains quite constant.

Throughout the foregoing descriptions of operation, it has been assumed that, at the time lever 36 or 36a contacts lever 16 to move that lever to open valve 15, the auxiliary valve 35 has been raised high enough to be fully open or substantially so. Further lifting of valve 35 then has negligible effect in further lowering the pressure under diaphragm 29 so that the closing forces exerted by spring 19 and/or diaphragm 29 are always at least slightly larger than the opening force on valve 15. However, by utilizing for closing spring 19 a spring of an appropriate spring rate, auxiliary valve 35 need not be wide open when 36 contacts 16 and begins to open valve 15. By proper choice of spring rate for 19, its increasing closing force can be made to offset the decrease in the closing force of diaphragm 29 as valve 35 opens more nearly to its wide open position.

Throughout this specification and the following claims the term "diaphragm" is used in the sense of any equivalent member movable by applied fluid pressure.

I claim:

1. In a fluid pressure regulator, a body and a main diaphragm enclosing a diaphragm chamber, an inlet and an outlet for the chamber, a main valve controlling the inlet, an auxiliary diaphragm forming with the body an auxiliary diaphragm chamber, connective means whereby the auxiliary diaphragm may exert force on the inlet controlling valve in a valve-closing direction, a pressure communication passage connecting the auxiliary chamber with the inlet at a point outside the valve, a restriction in said communication passage, a pressure relief outlet communicating with the auxiliary chamber, an auxiliary valve controlling the pressure relief outlet, and connective means operative between the main diaphragm and the two valves whereby movement of said diaphragm inwardly into its chamber first opens the auxiliary valve and then opens the main valve.

2. A fluid pressure regulator as defined in claim 1, and including means exerting a constant force on the inlet controlling valve in a valve-closing direction.

3. A fluid pressure regulator as defined in claim 2, in which the inlet controlling valve closes in a direction against the fluid pressure at the inlet, and in which the means exerting a constant force on the inlet controlling valve is a spring exerting on the valve a force not substantially greater than that necessary to hold said valve closed.

4. In a fluid pressure regulator, a body and a main diaphragm enclosing a diaphragm chamber, an inlet and an outlet for the chamber, a valve controlling the inlet, an auxiliary diaphragm forming with the body an auxiliary diaphragm chamber, a pressure communication passage connecting the auxiliary chamber with the inlet at a point outside the valve, a restriction in said communication passage, a pressure relief outlet communication passage, a pressure relief outlet communicating with the auxiliary chamber, an auxiliary valve controlling the pressure relief outlet, valve levers for the inlet controlling valve and the auxiliary valve, connective means between the main diaphragm and the auxiliary valve lever whereby inward movement of that diaphragm into its chamber moves that valve lever in a valve opening direction, connective means whereby the auxiliary diaphragm may exert a force on the inlet controlling valve lever in a valve closing direction, and operative connective means between the two valve levers operating to move the inlet controlling valve lever in a valve opening direction after the auxiliary valve has been opened.

5. A fluid pressure regulator as defined in claim 4, and in which the operative connective means between the two valve levers consists in a relative arrangement of said levers whereby the auxiliary valve lever contacts the inlet controlling valve lever after the auxiliary valve lever has been moved to open the auxiliary valve.

6. A fluid pressure regulator as defined in claim 4, and including means exerting a constant force on the inlet controlling valve lever in a valve closing direction.

7. A fluid pressure regulator as defined in claim 6, and in which the inlet controlling valve closes in a direction against the fluid pressure at the inlet, and in which the means exerting a constant force on the inlet controlling valve lever is a spring exerting a force not substantially greater than that necessary to hold the valve closed.

8. In a fluid pressure regulator, a body and a main diaphragm enclosing a diaphragm chamber, an inlet and an outlet for the chamber, a main valve controlling the inlet, an auxiliary diaphragm forming with the body an auxiliary diaphragm chamber, connective means whereby the auxiliary diaphragm may exert force on the inlet controlling valve in a valve-closing direction, valvularly controlled means applying a controlled variable fluid pressure from the inlet at a point outside its valve to the auxiliary diaphragm chamber, and connective means operative between the main diaphragm and the inlet controlling valve and said valvularly controlled means whereby movement of the main diaphragm inwardly into its chamber first operates said valvularly controlled means to reduce the fluid pressure in the auxiliary diaphragm chamber and then operates to open the main valve.

9. A fluid pressure regulator as defined in claim 8, and including means exerting a constant force on the inlet controlling valve in a valve-closing direction.

10. A fluid pressure regulator as defined in claim 9, in which the inlet controlling valve closes in a direction against the fluid pressure at the inlet, and in which the means exerting a constant force on the inlet controlling valve is a spring exerting on the valve a force not substantially greater than that necessary to hold said valve closed.

HAROLD W. ENSIGN.

References Cited in the file of this patent

UNITED STATES PATENTS

| Number | Name | Date |
| --- | --- | --- |
| 411,062 | Rossney | Sept. 17, 1889 |
| 439,586 | Crawford | Oct. 28, 1890 |
| 455,478 | Threlkeld | July 7, 1891 |
| 2,221,564 | Arnold | Nov. 12, 1940 |